No. 892,294. PATENTED JUNE 30, 1908.
J. NICHOLSON.
VEHICLE WHEEL.
APPLICATION FILED MAY 24, 1907.
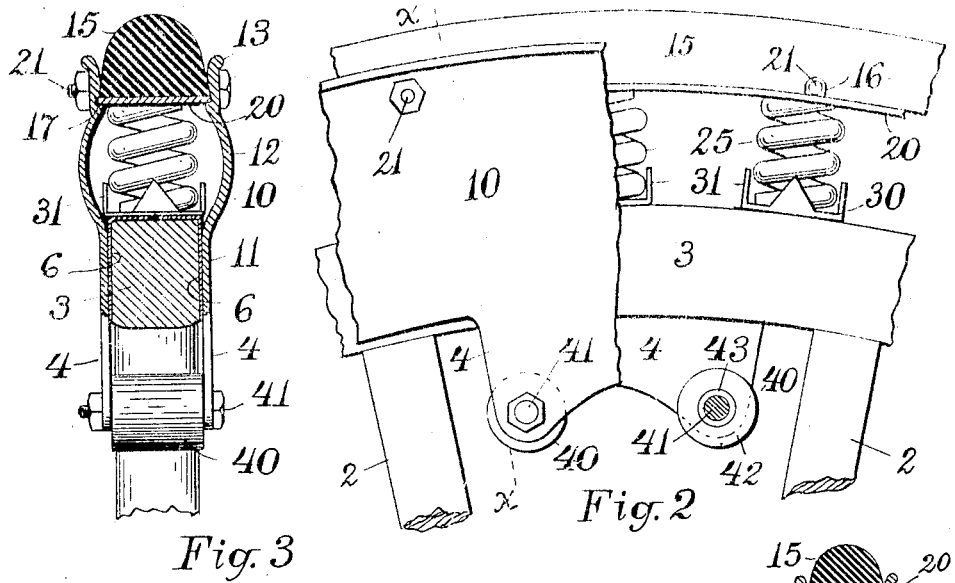
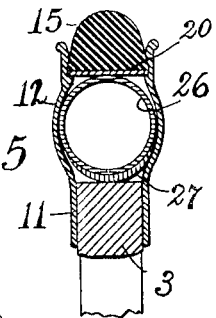
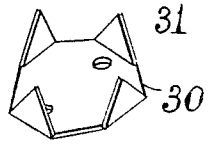
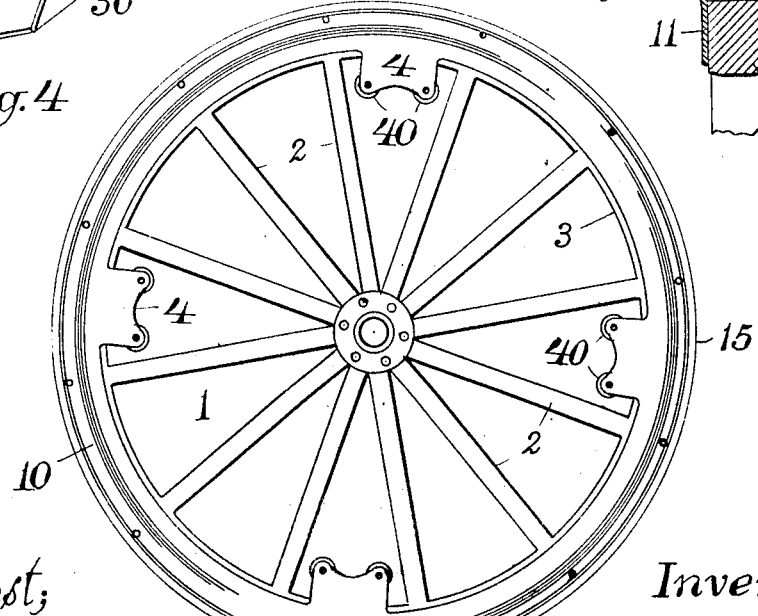
Attest:
H. J. Jennison.
L. L. Banga.
Inventor,
Joseph Nicholson;
By A. B. Upham,
Attorney.

UNITED STATES PATENT OFFICE.

JOSEPH NICHOLSON, OF BOSTON, MASSACHUSETTS.

VEHICLE-WHEEL.

No. 892,294.　　　Specification of Letters Patent.　　Patented June 30, 1908.

Application filed May 24, 1907. Serial No. 375,426.

*To all whom it may concern:*

Be it known that I, JOSEPH NICHOLSON, a citizen of the United States, and a resident of the city of Boston, in the county of Suffolk and Commonwealth of Massachusetts, have invented certain new and useful Improvements in Vehicle-Wheels, of which the following is a full, clear, and exact description.

The object of this invention is the construction of an improved wheel for automobiles and other vehicles wherein a resilient tire or rim may be provided for absorbing or neutralizing shocks incident to a rough road, without the usual dangers arising from punctures, and also without the damaging vibration ordinarily communicated to the axles and running gear of the vehicle.

To this end, my invention consists essentially in the construction of new and improved means for resiliently supporting a wheel within a comparatively inflexible rim or tire.

Referring to the drawings forming part of this specification, Figure 1 is a side elevation of a vehicle wheel embodying my invention. Fig. 2 is a side elevation on a larger scale of a portion of the wheel rim and tire, with parts thereof broken away. Fig. 3 is a cross section thereof on the line X—X in Fig. 2. Fig. 4 is a perspective view of one of the spring sockets. Fig. 5 is a cross section of a slightly modified form of the invention.

The wheel 1 is formed with spokes 2 and rim 3 of substantially the usual construction, preferably of the so-called "artillery" type. On each side of the rim is located a thin metallic flange 10, a section 11 of which is flat and adapted to slidably contact with such rim-sides; while the section 12 is designed to swell outwardly and rise above said rim to form the spring-chamber. Beyond said swelling or bellied section is the flange proper 13 adapted to receive between the same the rubber tire or cushion 15. In grooves 17 just between the juncture of the bellied sections and flanges proper, are located the edges of the annular plate 20 composing the seat for said tire; the flanges being strongly bound together by bolts 21 penetrating the same immediately exterior to the annular plate 20. By having such bolts exterior to said plate and located in notches 16 in said tire, the latter is prevented thereby from creeping.

Between the annular plate 20 and the wheel rim are placed numerous radially arranged spiral springs 25; the size of wire from which they are manufactured, and the closeness together with which they are located depending upon the weight of the vehicle and its load for which the wheel is designed. These springs are held in place by means of sockets 30 fastened to the wheel rim; such sockets being each preferably struck up from a square of sheet metal, having upturned corners 31 suitably inclosing enough of the spring 25 to hold the latter in place. These sockets may be either riveted or otherwise fixed to the wheel rim.

The springs 25 are shown in the drawings as nearly equal in height to their diameter; but they should be much larger in diameter to their normal height in order to insure against their being overturned; or the sides of the sockets should be sufficiently higher than shown to insure against the same possibility.

From the inner edges of the flat sections 11, and preferably formed integral therewith, are several projections 4, each pair carrying between them a couple of rolls 40 each suitably mounted on a bolt 41 penetrating such parts. Each roll is either covered with rubber, or formed entirely of rubber 42 incasing a metallic shell or sleeve 43 turning on said bolt. The object of these projections and rolls is three-fold: first, to bind together the inner edges of the shells or flanges 10; second, to prevent the movable parts from moving too far radially at any time of unusual stress, and thereby unduly compressing the springs 25 at the underside of the wheel, and perhaps allowing the springs at the upper side to be so released of compression as to snap out of place. This security against undue centrifugal displacement is provided by the engagement of the rolls 40 with the inner surface of the rim 3. The third function performed by said rolls is to prevent the creeping which would otherwise occur between the rim and tire. Now, however, the rolls 40 come in contact with the spokes 2 behind them, and so firmly hold the shell 10 and rim 15 in place, while still permitting the freedom of sliding action between the said shells and rim 3.

By having said rolls rubber covered, the wooden spokes and the rim are kept from the injury thereto which might be caused were the rolls of some harder material. Further, the arrangement is rendered noiseless in action.

As is evident, the shells 10 and the embraced wheel-rim are in constant relation during the travel of the vehicle provided with these wheels; at every instant the relative movement at a point above the center being radial, as well as that directly below the center, while the points at the same level as the wheel center have a relative tangential movement. At other points, the relative movements are combinations of these in varying proportions.

To relieve the wear which might otherwise occur between the flat shell-sections 11 and the surfaces of the wooden rim 3, I prefer to cover the latter with a metallic shield 6, as shown in Fig. 2. I prefer to form these shields from angle iron, having the longer member of each cover the lateral face of the rim, while the shorter members thereof cover the peripheral surface of the rim. By having these shorter members fixed to the rim, as by the same rivets or screws as those which hold the sockets 30 in place, and having the longer members slightly resilient and tending to be pressed apart into closer engagement with the inner surfaces of the shell-sections 11, a thoroughly water-tight juncture is thereby effected, in order to insure against the access of water to the space between the rim and tire. At the same time, all rattling between the shell and rim is prevented, while the first named anti-wearing function is not in any way interfered with.

If desired, a pneumatic inner tube 26 may be substituted for the springs 25 above described; a crescent-shaped leather shield 27 being located between such inner tube and the periphery of the rim 3 in order to insure against possible pinching or wear upon such tube caused by the sliding action between the shells and the rim. Should such tube become more or less deflated, a fold could otherwise easily form at the juncture of a shell and the rim and be instantly shorn through and the tube ruined as the wheel revolved.

I prefer to make the shells from sheet metal stamped or pressed into the form described, in order that its weight shall be comparatively nothing, and the expense of its production very slight. I have shown the shells in Fig. 3 as bellied at 12, but where the coiled springs 25 are used for the resilient means, the shells can be made substantially flat; but such swelling enables any purchaser to readily substitute the inner tube 26 for the springs 25, should he at any time so desire; it adds to the ornate appearance of the wheel, and, more important still, considerably increases the strength of the shell in resisting torsional strains applied to the tire.

What I claim as my invention and for which I desire Letters Patent is as follows, to wit:—

1. The combination with a wheel, of a pair of shells slidably contacting with the lateral faces of the rim of said wheel, a cushion tire held by said shells, resilient means between said rim and tire, and rolls connected with said shells and adapted by their engagement with the rim and spokes of the wheel to limit the play of said shells.

2. The combination with a wheel, of a pair of shells slidably contacting with the lateral faces of the rim of said wheel, a cushion tire held by said shells, resilient means between said tire and rim, projections from the inner edges of said shells, and rubber covered rolls rotatably supported between said projections at suitable distances from the rim and the spokes of the wheel.

In testimony that I claim the foregoing invention, I have hereunto set my hand this 21st day of May, 1907.

JOSEPH NICHOLSON.

Witnesses:
GEORGE B. SAWTELLE,
A. B. UPHAM.